United States Patent [19]

Goel

[11] Patent Number: 4,737,574

[45] Date of Patent: Apr. 12, 1988

[54] POLY(AMIDE-THIOETHER) CONTAINING THERMOSET POLYMERIC COMPOSITION FROM REACTION OF BISOXAZOLINE WITH POLYTHIOL IN THE PRESENCE OF CERTAIN CATIONIC CATALYST

[75] Inventor: Anil B. Goel, Worthington, Ohio

[73] Assignee: Ashland Oil, Inc., Ashland, Ky.

[21] Appl. No.: 944,109

[22] Filed: Dec. 22, 1986

[51] Int. Cl.$^4$ ................... C08G 65/00; C08G 69/00
[52] U.S. Cl. ................................ 528/374; 528/373
[58] Field of Search ........................... 528/374, 373

[56] References Cited

U.S. PATENT DOCUMENTS 3,639,395  2/1972  Tomalia ........................... 528/373
3,738,961  6/1973  Tomalia et al. ..................... 528/374

Primary Examiner—Harold D. Anderson
Attorney, Agent, or Firm—John F. Jones

[57] ABSTRACT

A process for preparing thermoset polymers at an improved rate by copolymerizing a bisoxazoline with a polythiol compound in the presence of a catalytic amount of an alkali metal or an alkaline earth metal cationic complex of formula $MX_n$ wherein M represents lithium, potassium, sodium, magnesium, calcium or zinc, X represents $BF_4$, $BPh_4$, $ClO_4$, $PF_6$, $SbF_6$ or $AsF_6$ is described.

9 Claims, No Drawings

POLY(AMIDE-THIOETHER) CONTAINING THERMOSET POLYMERIC COMPOSITION FROM REACTION OF BISOXAZOLINE WITH POLYTHIOL IN THE PRESENCE OF CERTAIN CATIONIC CATALYST

The present invention relates to an improved process for the preparation of thermoset polymers from bisoxazolines and polythiols by use of an alkali metal or alkaline earth metal cationic complex as catalyst.

The reaction of bisoxazolines with polythiols (also called polymercaptans) to give thermoplastic or thermoset polymers has been described in U.S. Pat. No. 3,639,395. The reaction has been found to be quite slow requiring much higher reaction temperatures (greater than 150° C.) and several minutes to hours for the reaction to go to completion. Usually, the reactions reach to near completion to give infusible products within a few minutes at moderately elevated temperatures, preferably from about 100° to 200° C.

I have discovered an improved process having much improved reaction rates for forming thermoset polymeric products by carrying out the reaction of bisoxazolines with polythiols at a temperature in the range of from about 100° C. to about 200° C. in the presence of from about 0.1 to about 5% by weight based on the weight of other ingredients of a catalyst of the formula $MX_n$, wherein M represents lithium, potassium, sodium, magnesium, calcium, or zinc, X represents $BF_4$, $B(phenyl)_4$, $ClO_4$, $PF_6$, $SbF_6$, or $AsF_6$ and n represents 1 or 2.

The bisoxazolines useful in the present invention include those having the formula

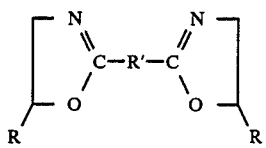

wherein R represents hydrogen, an alkyl group or hydroxy alkyl group having from 1 to 10 carbon atoms and R' represents an alkylene group having from 2 to 20 carbon atoms, an arylene group having from 6 to 12 carbon atoms or an alkarylene group having from 7 to 20 carbon atoms. The reaction of a bisoxazoline with a dithiol in the absence of any catalyst has been described in the prior art to give a thermoplastic polymer [J. Poly. Sci., Vol. 18, 761 (1980)].

The thiols or mercaptans useful in the instant invention include compounds having two or more thiol groups per molecule such as dithiols and polythiols including alkylene dithiols, alkylene ether polythiols, glycol dimercaptoacetate, dipentaerythritol tetrathio glycolate, polyethylene glycol dimercapotoacetates, polyethylene glycol di(3-mercaptopropionates), trimethylolethane tri(3-mercaptopropionate), trimethylolethane trithioglycolate, trimethylolpropane trithioglycolate, 2,2'-dimercapto diethyl ether, and the like and others. Other polythiols to be used in this invention include methanedithiol, 1,1-propanedithiol, 1,1-dimercaptoisoctane, 2,2-propanedithiol, 3,3-pentanedithiol, a,a-toluenedithiol, 1,2-ethanedithiol, trimethylene-1,3-dithiol, 1,2-propanedithiol, 1,4-tetramethylenedithiol, 2,3-butanedithiol, 1,5-pentamethylenedithiol, 2,2-dimethylpropanedithiol-1,3, 1,6-hexamethylenedithiol, 1,2-hexanedithiol, a,a-decamethylenedithiol, 1,6-dimethyloctanedithiol-3,7, 2,6-dimethyloctanedithiol-2,6, pentadecanedithiol-7,8, octadecamethylene a,a-dithiol, 1,2-cyclohexanedithiol, 1,1-bis(mercaptomethyl)cyclohexane, 3,4-thiophenedithiol, propanetrithiol-1,2,3, neopentanetetrathiol, dithiocatechol, dithioresorcinol, dithiohydroquinone, 4,5-dimethyldithioresorcinol, 2,4-dimethyldithioresorcinol, 4-ethyldithioresorcinol, 2,5-dichlorodithioresorcinol, 1,4-naphthalenedithiol, 1,5-naphthalenedithiol, 2,6-napththalenedithiol, 2,7-naphthalenedithiol, 2,2'-dimercaptobiphenyl, and 4,4'-dimercaptobiphenyl.

The reaction of bisoxazolines with dithiols wherein the equivalent ratios of oxazoline groups to thiol groups range from 1:1 to a large excess of oxazoline (e.g. 10:1) without the use of the catalysts of this invention produces thermoplastic polymers soluble in organic solvents such as dimethyl formamide, N-methylpyrrolidone, etc. In my process, similar reactions in the presence of the catalyst of this invention produces infusible thermoset polymers possibly indicating the cross-linking by partial bisoxazoline homopolymerization as reported in earlier copending U.S. patent application Ser. No. 765,634, filed 8/15/85. Reactive additives such as polyepoxide resins may be included in the polymerization reactions of this invention. The resins produced by the process of this invention may also be filled with fillers and reinforcement fibers and other materials known to those in the art. The rapid setting thermoset compositions of this invention may be used in applications such as adhesives, coatings, reaction injection molding (RIM) for structural materials such as auto parts and the like.

This invention is further illustrated in the following representative examples.

EXAMPLE 1

This example is presented for comparative purposes and otherwise is outside the scope of the present invention. A bisoxazoline (of the foregoing formula wherein R is hydrogen and R' is a 1,3-phenylene group) (3.5 g) and 2 g of polyethylene glycol di(3-mercaptoproprionate) thiol (equivalent weight of about 185) were mixed in an aluminum dish and the mixture was heated at 168° C. for one hour to give a viscous product which solidified upon cooling to room temperature. The product was found to be soluble in dimethyl formamide and methyl pyrrolidinone indicating it to be at best a thermoplastic material.

EXAMPLE 2

The procedure of Example 1 was followed using the reaction charge of Example 1 except that a small amount of a cationic catalyst of this invention was also used. A solution of 2 g of the dithiol of Example 1 containing 0.075 g of lithium fluoborate catalyst was mixed with 3.5 g of the bisoxazoline of Example 1 and the reaction mixture was heated at 168° C. The mixture first became a clear solution and then gelled in about one minute after heating to give an infusible thermoset polymer. The polymer was post cured for 30 minutes at 160° C. and the Tg by DSC (Differential Scanning Calorimetry) was found to be 4° C. and 5% weight loss in nitrogen by TGA (Thermogravimetric Analysis) occurred at about 293° C.

EXAMPLE 3

The procedure of Example 2 was followed using 3.5 g of bisoxazoline, 2.5 g of trimethylol propane tris(3-mercaptopropionate) (in place of the dimercaptan of Example 2) and 0.07 g of lithium fluoborate. The resulting mixture was heated at 168° C. Gelation occurred within 1.2 minutes to give an infusible polymer having a Tg by DSC of 55° C. and 5% weight loss in nitrogen by TGA occurred at 281° C.

EXAMPLE 4

This Example is for comparison purposes and is outside the scope of this invention. The reaction charge of Example 3 was used except that no catalyst was included. The reaction mixture was heated at 168° C. for 30 minutes during which time no gelation occurred.

EXAMPLE 6

The procedure of Example 2 was followed using 3.5 g of bisoxazoline, 1.5 g of dipentaerythritol hexa(3-mercaptopropionate) in place of the dithiol and 0.05 g of lithium fluoborate catalyst. Gelation occurred in the resulting mixture within two minutes at when subjected to heating at 165° C. to give an infusible thermoset polymer. The polymer after post cure for 30 minutes at 160° C. was found to have a Tg by DSC of 36° C. and a 5% weight loss in nitrogen by TGA at 310° C.

EXAMPLE 7

This Example is for comparative purposes and is outside the scope of the present invention. The reaction charge of Example 6 was used except no catalyst was included. Heating of the resulting mixture at 170° C. for 20 minutes did not produce a gelled product.

EXAMPLE 8

The procedure of Example 1 was followed using 2.5 g of bisoxazoline, 1 g of liquid diglycidyl ether of Bisphenol-A (epoxy equivalent weight of 185), 1 g of dipentaerythritol hexa(3-mercaptopropionate), 12 g of the dithiol of Example 1 and 0.07 g of lithium fluoborate catalyst. A rapid reaction occurred when the resulting mixture was heated at 170° C. to give a thermosetting polymer within one minute. The polymeric product was post cured at 160° C. for 30 minutes and was then found to have a Tg by DSC of 60° C. and had a 5% weight loss by TGA in nitrogen at 280° C.

I claim:
1. An improved process for the preparation of thermoset polymers comprising copolymerizing a bisoxazoline having the formula

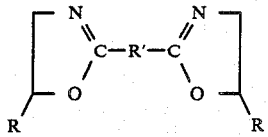

wherein R represents hydrogen, an alkyl group or hydroxy alkyl group havin from 1 to 10 carbon atoms and R' represents an alkylene group having from 2 to 20 carbon atoms or an alkarylene group having from 7 to 20 carbon atoms with a polythiol compound in the presence of a metal cationic complex having the formula $MX_n$ wherein M represents lithium, potassium, sodium, magnesium, calcium or zinc, X represents $BF_4$, $B(phenyl)_4$, $ClO_4$, $PF_6$, or $AsF_6$ and n represents 1 or 2.

2. The process of claim 1 carried out at a temperature in the range of from about 100° C. to about 200° C.

3. The process of claim 2 wherein the metal cationic complex is present in from about 0.1 to about 5% by weight based on the other ingredients.

4. The process of claim 3 wherein the polythiol compound is one having two or more thiol groups per molecule.

5. The process of claim 4 wherein the bisoxazoline is one in which R represents hydrogen and R' represents a 1,3-phenylene group.

6. The process of claim 5 wherein the polythiol is a polyethylene glycol di(3-mercaptopropionate) thiol and the metal cationic complex is lithium fluoborate.

7. The process of claim 5 wherein the polythiol is trimethylol propane tris(3-mercaptopropionate) and the metal cationic complex is lithium fluoborate.

8. The process of claim 7 wherein the polythiol is dipentaerythritol hexa(3-mercaptopropionate) and the metal cationic complex is lithium fluoborate.

9. The process of claim 5 wherein the polythiol is a mixture of dipentaerythritol hexa(3-mercaptopropionate) and polyethylene glycol di(3-mercaptopropionate) and the metal cationic complex is lithium fluoborate.

* * * * *